United States Patent [19]

Moore et al.

[11] Patent Number: 6,089,328
[45] Date of Patent: Jul. 18, 2000

[54] HITCH ASSEMBLY FOR A WORK MACHINE

[75] Inventors: Jeffrey A. Moore, Waterman, Ill.; Gregory K. Stuckey, Omaha, Nebr.; Lynn A. Sutton, Kewanee, Ill.

[73] Assignee: Caterpillar, Inc., Peoria, Ill.

[21] Appl. No.: 09/141,965

[22] Filed: Aug. 28, 1998

[51] Int. Cl.$^7$ .................................................. A01B 59/043
[52] U.S. Cl. ........................................ 172/447; 172/439
[58] Field of Search .................................. 172/447, 448, 172/439

[56] References Cited

U.S. PATENT DOCUMENTS

| | | |
|---|---|---|
| 1,557,841 | 10/1925 | Holmes . |
| 2,731,898 | 1/1956 | Frevik et al. . |
| 3,310,123 | 3/1967 | Abbott . |
| 3,583,494 | 6/1971 | Thompson ............... 172/439 X |
| 3,838,740 | 10/1974 | Rogers et al. ................. 172/439 |
| 3,884,310 | 5/1975 | Soucek et al. ................. 172/292 |
| 4,200,306 | 4/1980 | Helms ............................ 280/494 |
| 4,711,461 | 12/1987 | Fromberg ....................... 280/494 |
| 4,944,649 | 7/1990 | Stralow ..................... 172/447 X |
| 5,186,483 | 2/1993 | Sheppard ....................... 280/494 |
| 5,531,283 | 7/1996 | Austin et al. ................. 180/53.1 |
| 5,601,146 | 2/1997 | Schlegel et al. .............. 172/439 |
| 5,697,454 | 12/1997 | Wilcox et al. ................. 172/447 |
| 5,709,274 | 1/1998 | Herbold ......................... 172/248 |

FOREIGN PATENT DOCUMENTS

| | | |
|---|---|---|
| 201 786 A2 | 11/1986 | European Pat. Off. . |
| 2 698 517 | 1/1996 | France . |

*Primary Examiner*—Christopher J. Novosad
*Attorney, Agent, or Firm*—Jeff A. Greene

[57] ABSTRACT

A hitch for a work machine such as an agricultural tractor permits controlled towing of an implement behind the work machine. The hitch is attached to the machine frame. The hitch includes first and second draft arms that are pivotally connected with and spaced apart on the frame by intermediate links. The intermediate links provide pivotal movement of the draft arms constrained about a first horizontal axis. The intermediate links also provide pivotal movement of the first draft arm constrained about a second axis, and of the second draft arm constrained about a third axis. At least one draft cylinder is connected to one of the intermediate links and to a respective draft arm. The hitch incorporates multiple degrees of movement in a compact package and is useful as a steerable component of the machine to provide positive steering force.

9 Claims, 3 Drawing Sheets

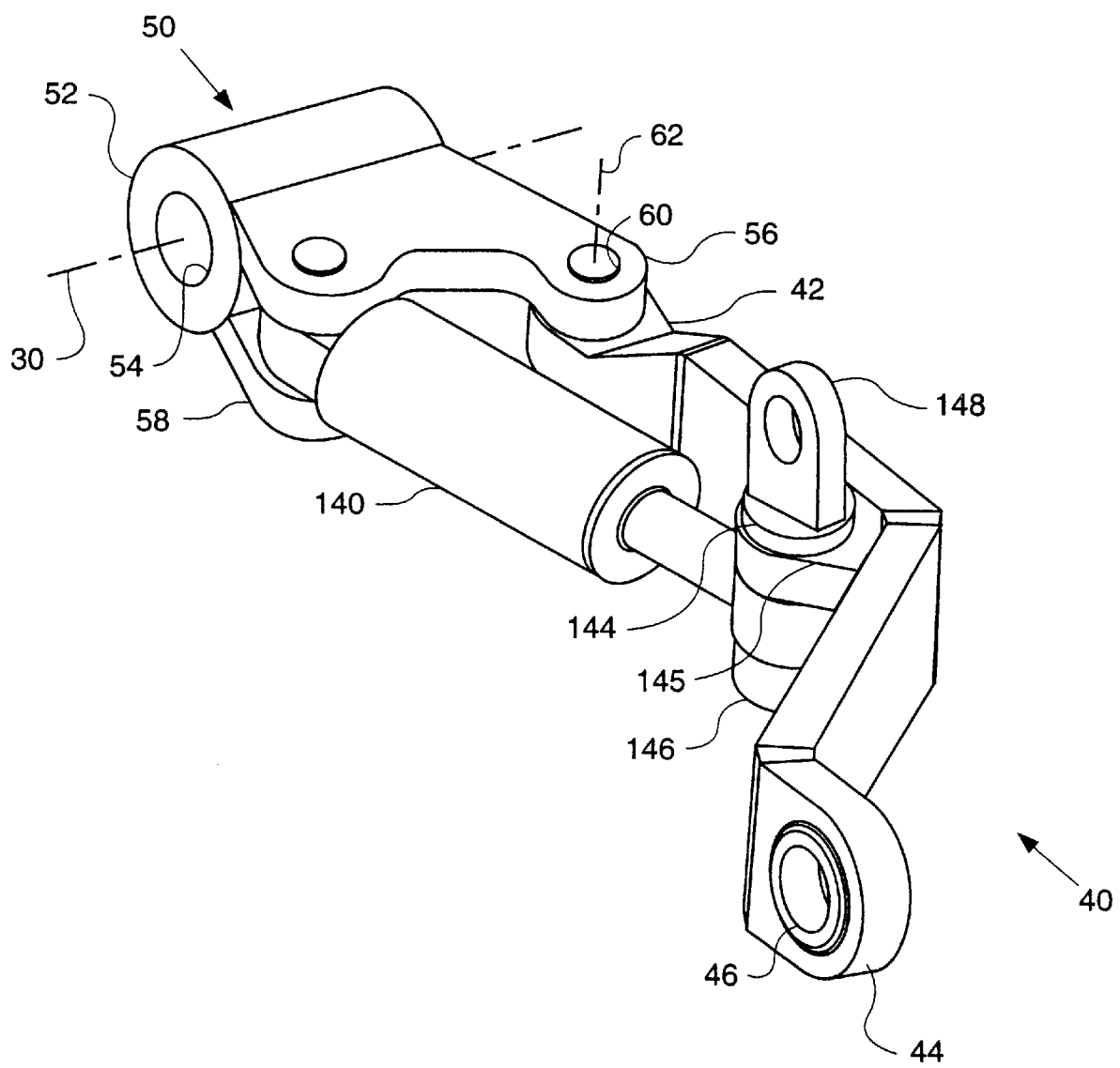

HITCH ASSEMBLY FOR A WORK MACHINE

TECHNICAL FIELD

The present invention relates to a hitch arrangement, and more specifically, to a steerable hitch arrangement for a work machine.

BACKGROUND ART

Work machines, such as agricultural tractors are commonly used to tow wide implements behind them for various purposes, including planting and plowing. In row crop applications it is imperative for the implement to track the rows with precision to prevent crop damage. Wide implements require high steering effort when negotiating turns with the implement in the soil. The high steering requirements for these implements can exceed the capability of some machines. It is very important to control the implement so that turning and other desired operations can be readily accomplished.

Hitches are commonly incorporated on the back of a work machine to provide a point of attachment for the implement to the machine. Such hitches have been designed to provide some movement of the implement relative to the work machine through hydraulic or other mechanisms controlled by the operator. For example, some hitches provide some guidance for steering an implement left or right. Other hitches have been used to raise and lower a draw bar through which an implement can be attached to the hitch.

The hitches previously known have used a variety of different linkage arrangements to provide one or more of the limited degrees of movement described above. However, hitches need to be compact and utilize mechanisms that provide the necessary movement and still allow the work machine to be changed between narrow and wide row crop gage settings. Therefore, it is desirable to provide a compact hitch that can exert steering forces on the implement and aid the work machine to precisely maneuver turns. The present invention is directed to overcoming one or more of the problems as set forth above.

DISCLOSURE OF THE INVENTION

In one aspect of the present invention, a hitch assembly is provided for attaching an implement to a work machine. The hitch assembly is mounted on the machine frame and includes a draft arm assembly. The draft arm assembly includes first and second draft arms. The first draft arm has a first end portion that is connected to the machine frame and adapted for pivotal movement about first axis and a second axis that is perpendicular and remote from the first axis, and a second end portion that is adapted for connection to the implement. The second draft arm has a first end portion that is connected to machine frame and adapted for pivotal movement about first axis and a third axis that is perpendicular and remote from the first axis, and a second end portion that is adapted for connection to the implement.

In another aspect of the present invention, a draft arm assembly is provided for connecting an implement to a machine frame. The assembly includes a draft arm having a first end portion and a second end portion. The second end portion is used for connection to the implement. A pivot means connects the draft arm to the machine frame and provides pivotal movement about a first axis and about a second axis perpendicular to and remote from the first axis.

In yet another aspect of the present invention, a draft arm assembly is provided for connecting an implement to a machine frame. The draft arm assembly includes an intermediate link that is connected to the machine frame and adapted for pivotal movement about a first axis. A draft arm is pivotally connected to the intermediate link and is pivotally moveable about a second axis which is perpendicular to and remote from the first axis. A draft cylinder is pivotally connected to the intermediate link and between the draft arm.

BRIEF DESCRIPTION OF THE DRAWINGS

FIG. 3 shows a perspective view of a single draft arm of the hitch assembly shown in FIGS. 1 and 2.

BEST MODE FOR CARRYING OUT THE INVENTION

Figure 1:
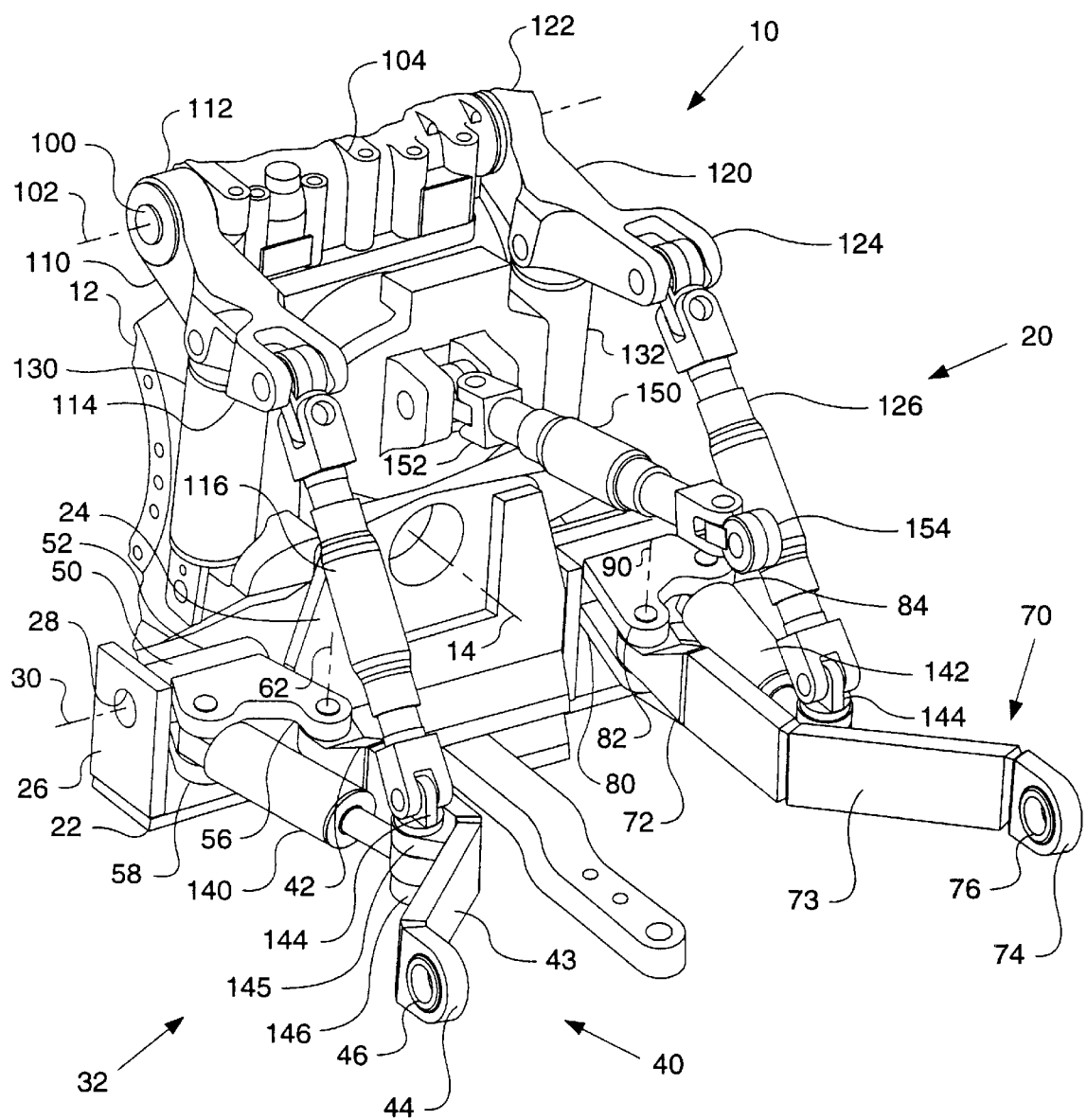
FIG. 1 shows a partial perspective view of a work machine with a hitch assembly constructed in accordance with the present invention.

As shown in FIG. 1, a work machine (not fully shown) is generally indicated at 10. The work machine 10 is for example, an agricultural tractor having a frame 12 defining a longitudinal axis 14. The work machine 10 includes drive means (not shown) that are connected to and positioned on opposite sides of the frame 12. Extending from the rear of the frame 12 is a hitch assembly 20. The hitch assembly 20 is used to couple an implement (not shown), such as a plow or planter, to the frame 12.

The hitch assembly 20 has a sub frame 22 that is positioned transversely relative to the longitudinal axis 14 at the rear of the frame 12. The sub frame 22 is a fabricated structure including a vertical plate 24 that is mounted to the frame 12, typically by bolts or the like (not shown). A pair of spaced apart plates 26, one of which is clearly shown in FIG. 1, form receiving areas on opposite sides of the sub frame 22. A bore 28 is positioned in each of the spaced apart plates 26 and defines an axis 30 at the rear of frame 12. The receiving areas formed by plates 26 are used to mount a draft arm assembly 32 to the frame 12. Draft arm assembly 32 includes a first draft arm 40 and a second draft arm 70. It should be understood as an alternative that the frame 12 could be adapted in a manner to directly connect the draft arm assembly 32 thereto.

The first draft arm 40, as shown in FIG. 3, has a first end portion 42, a middle portion 43 and a second end portion 44. The first end portion 42 is generally parallel to the second end portion 44 with the middle portion 43 providing a dog leg connection therebetween. The second end portion 44 has a pivotal connection 46, such as a spherical joint, for connection to the implement. First end portion 42 is connected with the sub frame 22 by a pivot means 48, which includes an intermediate link 50.

As shown in FIG. 3 intermediate link 50 has a tubular portion 52 having a bore 54 located therein. Intermediate link 50 is connected to sub frame 22 by a pin or bolt (not shown) being positioned through bore 28 and bore 54 and is pivotally movable about first axis 30. The intermediate link 50 also includes a first and a second laterally spaced clevis like receiving portions 56, 58. First and second receiving portions 56, 58 are formed by an upper and a lower plate attached to the tubular portion 52 in spaced parallel relationship. A pair of bores 60 are positioned in the upper and lower plate of the first receiving portion 56 and define a second axis 62 which is perpendicular to and remote from first axis 30. The first end portion 42, of the first draft arm 40, is positioned in first receiving portion 56 and connected thereto by a pin or bolt (not shown). Therefore, the first draft arm 40 is connected with frame 12 and is pivotally moveable about first and second axes 30, 62. It should be recognized that many suitable arrangements could be used for connecting first draft arm 40 to frame 12 and still provide pivotal movement about first and second axes 30, 62.

As shown in FIG. 1 the second draft arm 70 has a first end portion 72, a middle portion 73 and a second end portion 74. The first end portion 72 is generally parallel to the second end portion 74 with the middle portion 73 providing a dog leg connection therebetween. The second end portion 74 has a pivotal connection 76, such as a spherical joint, for connection to the implement. First end portion 72 is connected with the sub frame 22 by a pivot means 78 which includes an intermediate link 80.

Intermediate link 80 (partially shown in FIG. 1) is substantially identical to and a mirror image of intermediate link 50 as will be described below. Intermediate link 80 is connected to sub frame 22 by a pin or bolt (not shown) and is pivotally movable about first axis 30. The intermediate link 80 also includes a first and a second clevis like receiving portion 82, 84. A pair of bores 86 are positioned in the upper and lower portions of the first receiving portion 82 and define a third axis 88 which is perpendicular to and remote from the first axis 30. The first end portion 72, of the second draft arm 70, is positioned in the first receiving portion 82 and connected thereto by a pin or bolt (not shown). Therefore, the second draft arm 70 is connected with frame 12 and is pivotally moveable about the first and third axes 30, 88.

Referring to FIG. 1, a rock shaft 100 defining an axis 102 that is parallel to axis 30, is spaced above and substantially centered relative to sub frame 22. Rock shaft 100 is rotatably mounted on the machine frame 12 by a conventional split bearing arrangement 104.

A first lift arm 110 has a first end portion 112 that is fixedly attached to one end of the rock shaft 100, in a conventional manner such as by splines. A second end portion 114 of lift arm 110 is pivotally connected to a lift link 116. Lift link 116 is an adjustable length link such as a turnbuckle but any suitable adjustable link, such as a hydraulic cylinder, could also be used and still be within the scope of the present invention. The other end of lift link 116 is connected the first draft arm 40 at a location interposed the first and second end portions 42, 44.

A second lift arm 120 has a first end portion 122 that is attached, to an end of the rock shaft 100 opposite the first lift arm 110. A second end portion 124 is pivotally connected to a lift link 126. The other end of lift link 126 is connected to the second draft arm 70 at a location interposed the first and second end portions 72,74.

A first lift cylinder 130 is pinned to the frame 12 at one end and pivotally connected at an intermediate location between the first and second end portions 112,114 of the first lift arm 110. Thus, the first lift cylinder 130 is connectable to the frame 12 and with the first draft arm 40. One end of a second lift cylinder 132 is pinned to the opposite side of the frame 12 and pivotally connected at an intermediate location between the first and second end portions 122, 124 of the second lift arm 120. Thus, the second lift cylinder 132 is connectable to the frame 12 and with the second draft arm 70. It is, for example, preferable to have first and second lift cylinders 130, 132 with independent connections between the first and second draft arms 40,70. However, it should be recognized that a single lift cylinder 130 could be connected to the frame 12 and one of the first and second draft arms 40, 70, or to an intermediate position on the rock shaft 100 and provide substantially the same function.

A first draft cylinder 140 is pivotally connected to the second receiving portion 56 of the first intermediate link 50 at one end and the other end is pivotally connected interposed the first and second end portions 42,44 of the first draft arm 40. One end of a second draft cylinder 142 is pivotally connected to the second receiving portion 84 of the second intermediate link 80 and the other end is pivotally connected interposed the first and second end portions 72,74 of the second draft arm 70. It should be understood that a single draft cylinder 140 could be used without departing from the scope of the present invention.

As best shown in FIG. 3, the pivotal connection of the first lift link 116 and the first draft cylinder 140 to the first draft arm 40 is provided by fastener 144. Fastener 144 is positioned through an upper shoulder 145 one end of draft cylinder 140 and engages a lower shoulder 146, such as by threads. Fastener 144 also has an eyelet 148 that provides the connection point for the first lift link 116. In this application, for example, the first lift link 116 and the first draft cylinder 140 are connected to the first draft arm 40 on a common axis provided by fastener 144. However, this common axis is not required for proper operation, but provides a compact arrangement. The second lift link 126 and the second draft cylinder 142 are connected to the second draft arm 70 by fastener 144 in a like manner.

Returning to FIG. 1, a pitch link 150 is positioned between the frame 12 and the implement. A first end portion 152 of the pitch link 150 is pivotally mounted to the frame 12, at a location elevationally spaced from and centered between the first and second draft arms 40, 70, while a second end portion 154 is pivotally connectable to the implement. The pitch link 150 is adjustable in length so that the degree of inclination of the implement may be changed with respect to longitudinal axis 14. By varying the length of the pitch link 150 the implement is rotated about the respective connection to the draft arms 40,70 and therefore with respect to the work machine 10. The pitch link 150 is a turnbuckle type connection but could also be a hydraulic cylinder and still be within the scope of the present invention.

Figure 2:
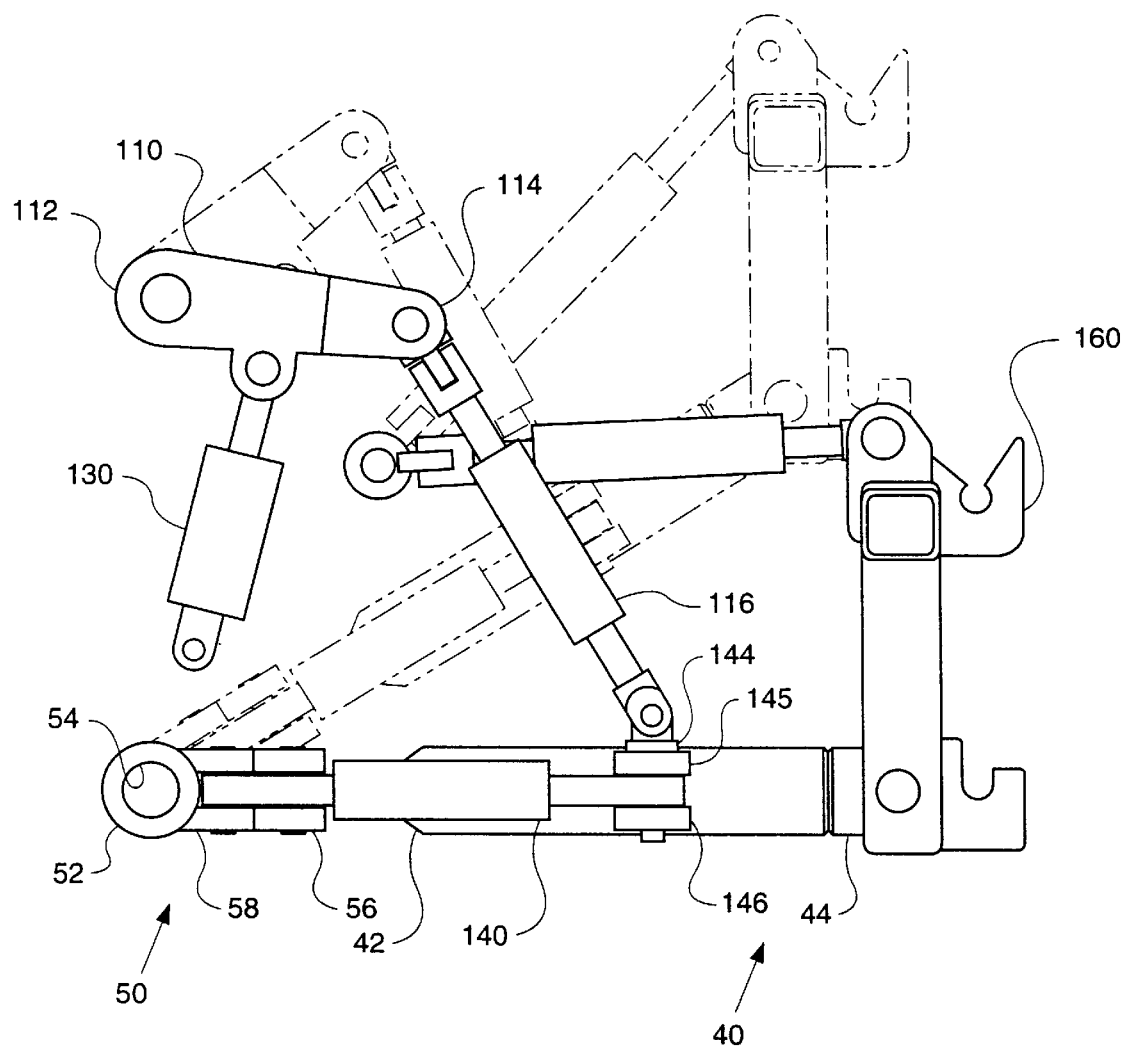
FIG. 2 shows a side view of the hitch shown in FIG. 1 in a working position, and with the hitch, in phantom in a raised position.

As seen in FIG. 2, hitch assembly 20 may also include a quick hitch 160. Quick hitch 160 can be connected to the second end portion 154 of the pitch link 150 and the second end portions 44,74 of the first and second draft arms 40,70. The quick hitch 160 is well known in the art and is used to provide easy connection of the work machine 10 to an implement.

The cylinders shown are all of conventional construction and are selectively actuated by controls through use of a pressurized hydraulic fluid source connected to the cylinders. The controls and pressurized hydraulic fluid source are typically carried on the machine (not shown). It is also contemplated that any other suitable substitutes for the cylinders may be used to control the hitch assembly 20.

Industrial Applicability

The disclosed hitch assembly 20 provides a very compact and multi-functional device for controlling implements to be towed behind the work machine 10. The arrangement of the various components comprising the hitch assembly 20 contribute to the compact design while retaining the desired degrees of movement. For example, the construction of the intermediate links 50, 80 permits connection of the first and second draft arms 40, 70 and the first and second draft cylinders 140, 142 to be placed in substantially the same space normally occupied by the draft arms 40, 70 alone.

In operation the hitch 20, in effect, is a steerable component on the work machine 10. Through actuation the length of the draft cylinders 140, 142 are selectively controlled to pivot of the draft arms 40, 70 about the second and third axes 62, 90. The length of the draft cylinders 140, 142 can also be automatically controlled by a machine control system. By pivoting the draft arms 40, 70 the hitch assembly 20 is used to exert a force on the implement. This force allows the work machine to achieve an initial turning angle with respect to the implement before encountering the implement load. The unique design also allows the lift cylinders 130, 132 to control movement of the draft arms 40, 70 about the first axis 30 for lifting the implement. These features make the hitch assembly 20 especially suitable for agricultural tractors which tow wide heavy implements through adverse soil conditions.

Other aspects, advantages, and objects of the invention can be obtained from a study of the drawings, the disclosure and appended claims.

What is claimed is:

1. A hitch assembly for attaching an implement to a work machine frame comprising:

a draft arm assembly including a first draft arm having a first end portion and a second end portion, said first end portion being connected with the machine frame and adapted for pivotal movement about a first axis and a second axis, the second axis being perpendicular to and remote from said first axis, said second end portion being adapted for connection to the implement;

a first intermediate link having first and second receiving portions, said first intermediate link being pivotally connected with the machine frame and adapted for pivotal movement about the first axis, said first receiving portion defining the second axis and being connectable to the first end portion of the first draft arm;

a second draft arm having a first and second end portion, said first end portion being connected with the machine frame and adapted for pivotal movement about said first axis and a third axis, the third axis being perpendicular to and remote from said first axis, said second end portion being adapted for connection to the implement, said second draft arm being disposed in generally parallel relationship to said first draft arm; and a second intermediate link having first and second receiving portions, said second intermediate link being pivotally connected with the machine frame and adapted for pivotal movement about the first axis, said first receiving portion defining the third axis and being connectable to the first end portion of the second draft arm; said hitch assembly further including at least one draft cylinder being pivotally connected with one of said first and second intermediate link.

2. The hitch assembly of claim 1, further including at least one lift cylinder connectable with the machine frame and to a one of said first draft arm and said second draft arm.

3. The hitch assembly of claim 1, wherein said at least one draft cylinder is pivotally connected to the second receiving portion of a one of saidfirst intermediate link and a second intermediate link and with a one of said first draft arm and said second draft arm.

4. The hitch assembly of claim 1, further including a pitch link adapted for pivotal connection between the machine frame and the implement at a location that is centered between and elevationally spaced from the first and second draft arms.

5. The hitch assembly of claim 1, further including a rock shaft, a first and a second lift arm, and a first and a second lift link, said rock shaft being rotatably mounted to the machine frame spaced above and substantially centered relative to said draft arm assembly, said first and second lift arm being in spaced relationship with one another and being connected to said rock shaft, said first and second lift link being respectively pivotally connected to said first and second lift arm and being respectively pivotally connected to the first and second draft arms.

6. The hitch assembly of claim 1, further including a quick hitch being pivotally connected to the first and second draft arms and a pitch link.

7. The hitch assembly of claim 1, wherein the length of said at least one draft cylinder is selectively controllable to provide a positive steering force on the implement.

8. The hitch assembly of claim 7, wherein the length of said at least one draft cylinder is automatically controlled by a machine control system.

9. A work machine comprising:

a machine frame defining a longitudinal axis; and a hitch assembly being connected to said machine frame and centered about said longitudinal axis as set forth in claim 1.

\* \* \* \* \*